Feb. 13, 1968  V. J. WALTER  3,368,422
VEHICLE STEERING GEAR
Filed Oct. 22, 1965  9 Sheets-Sheet 1
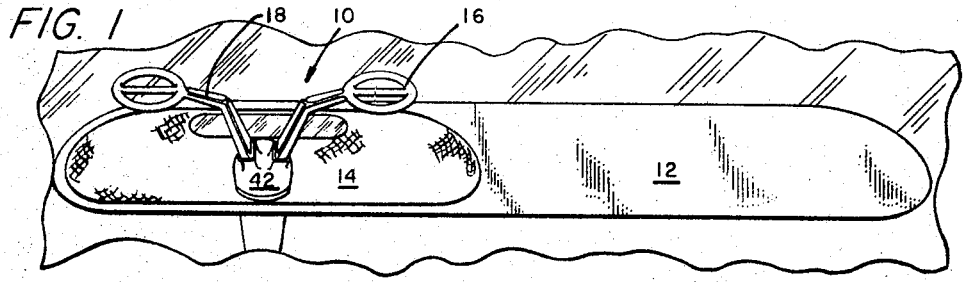
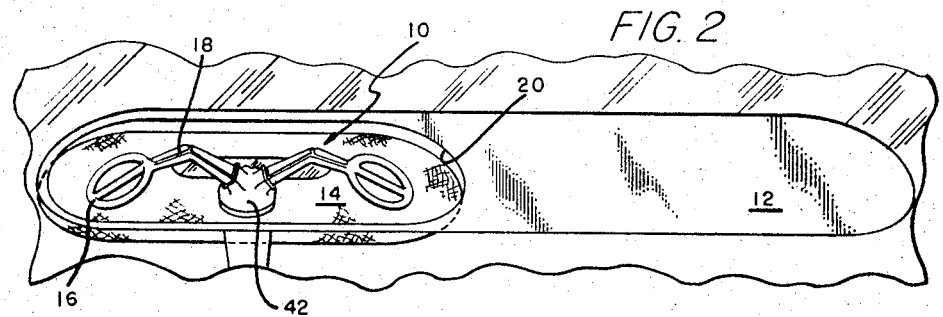
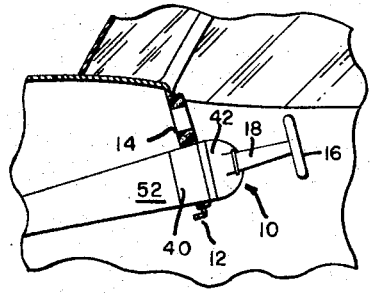
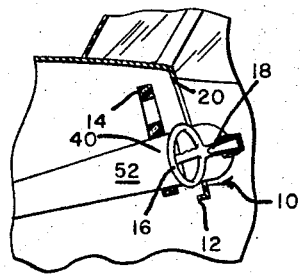
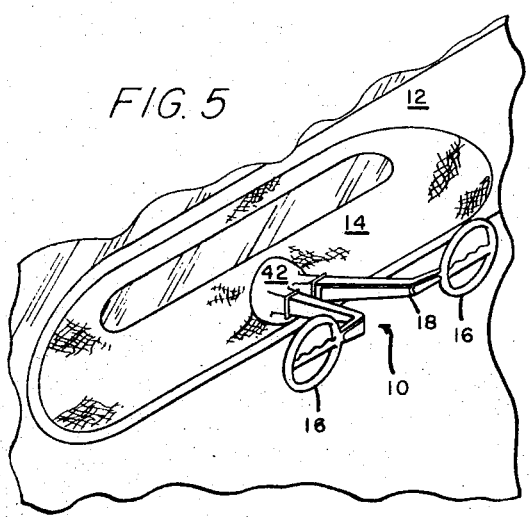
INVENTOR.
VINCENT J. WALTER
BY
*Duane C. Bowen*
ATTORNEY

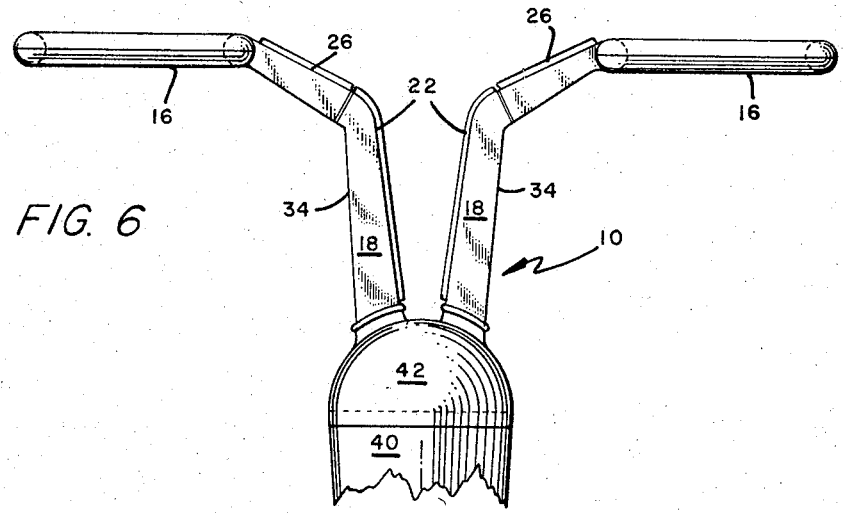
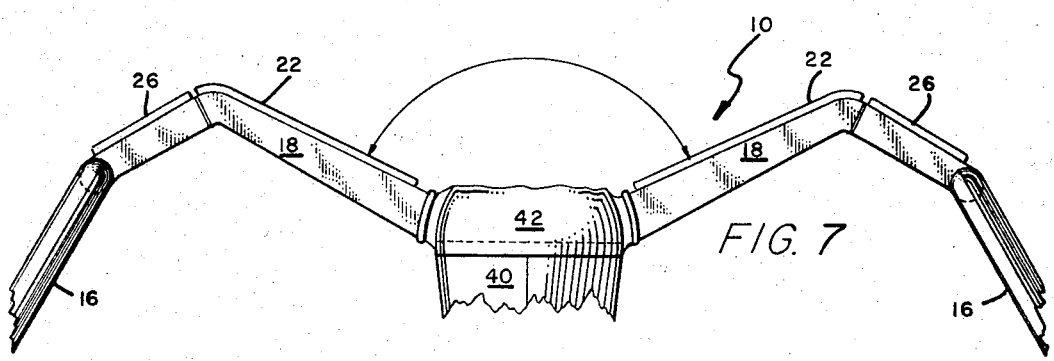
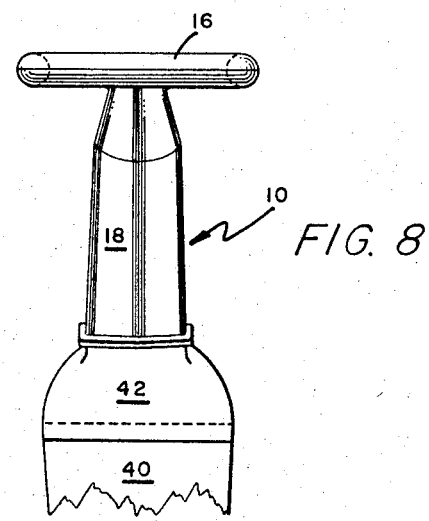

Feb. 13, 1968 V. J. WALTER 3,368,422
VEHICLE STEERING GEAR
Filed Oct. 22, 1965 9 Sheets-Sheet 4
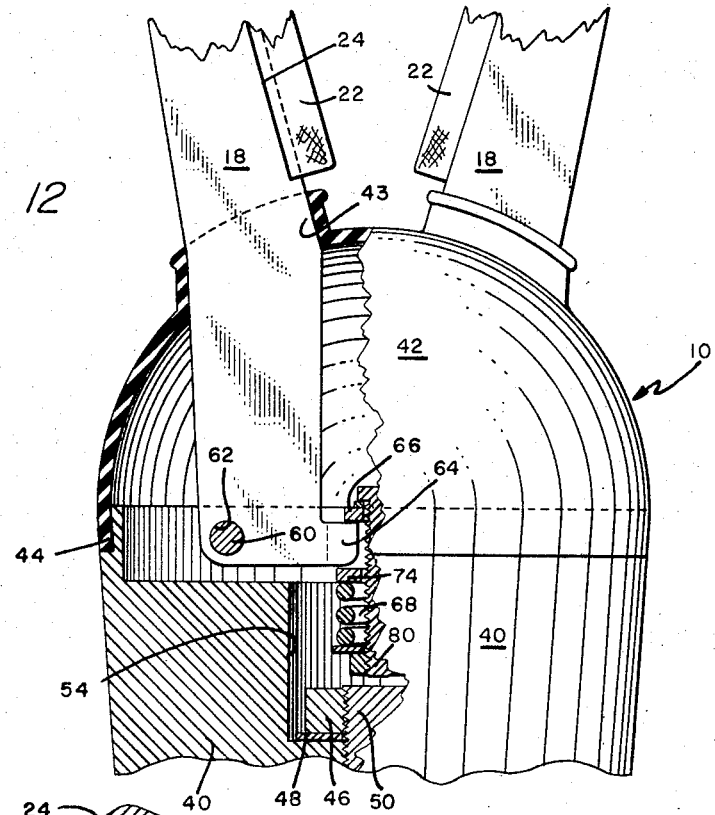
FIG. 12
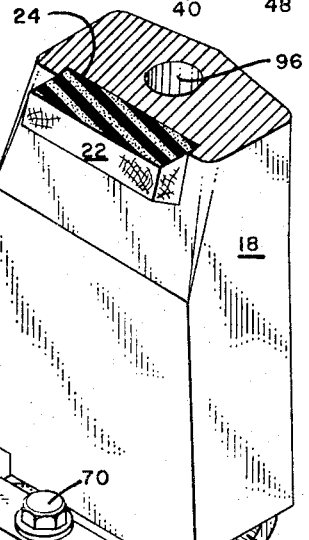
FIG. 13
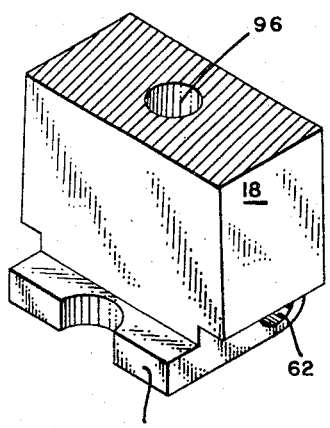
FIG. 14
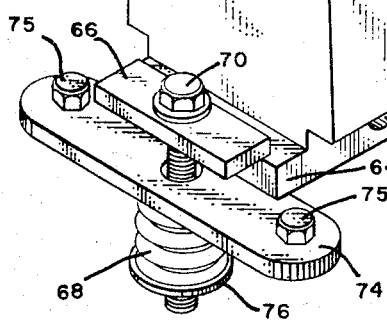
INVENTOR.
VINCENT J. WALTER
BY
ATTORNEY Feb. 13, 1968    V. J. WALTER    3,368,422
VEHICLE STEERING GEAR
Filed Oct. 22, 1965    9 Sheets-Sheet 5
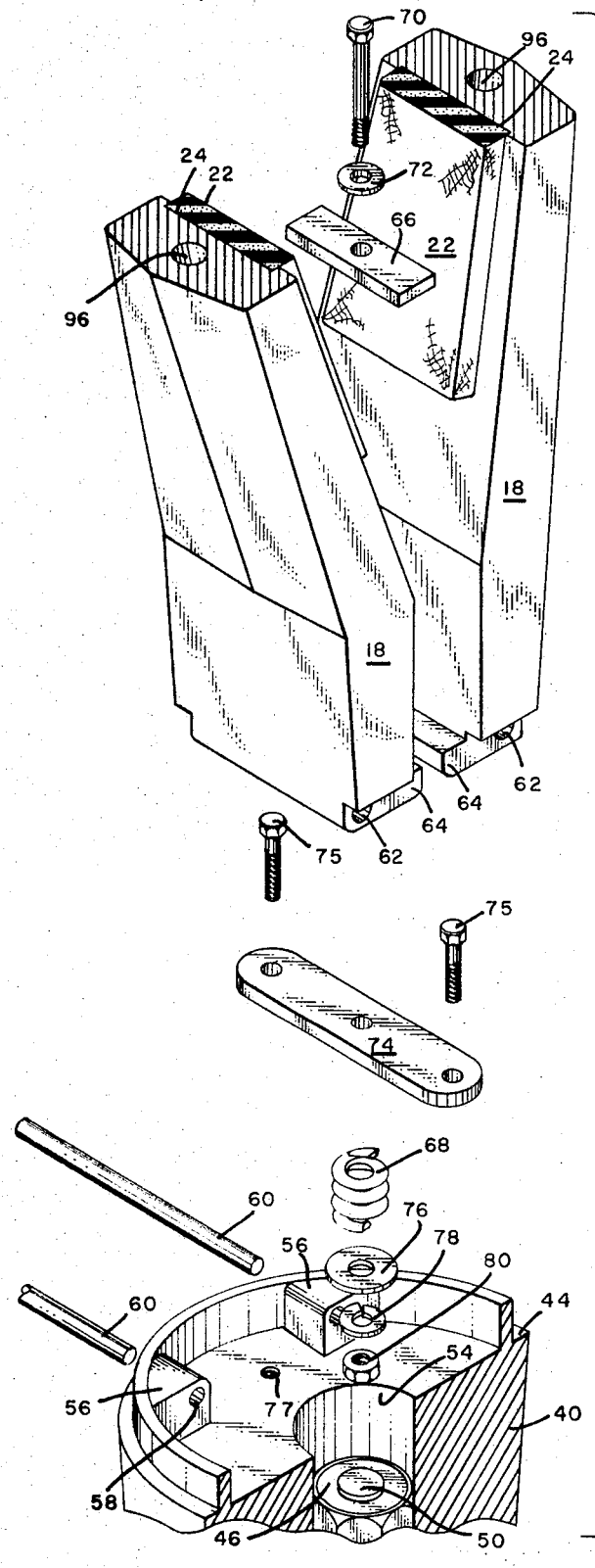
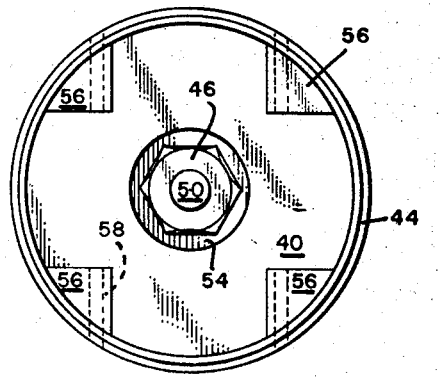
FIG. 16
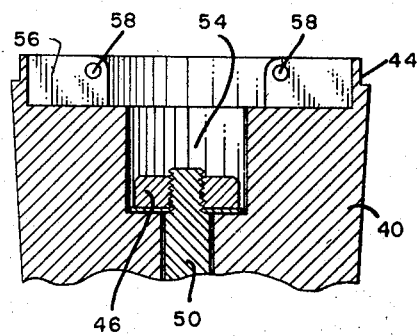
FIG. 17
INVENTOR.
VINCENT J. WALTER
BY
ATTORNEY Feb. 13, 1968  V. J. WALTER  3,368,422
VEHICLE STEERING GEAR Filed Oct. 22, 1965  9 Sheets-Sheet 8

INVENTOR.
VINCENT J. WALTER
BY
ATTORNEY

Feb. 13, 1968     V. J. WALTER     3,368,422
VEHICLE STEERING GEAR
Filed Oct. 22, 1965     9 Sheets-Sheet 9
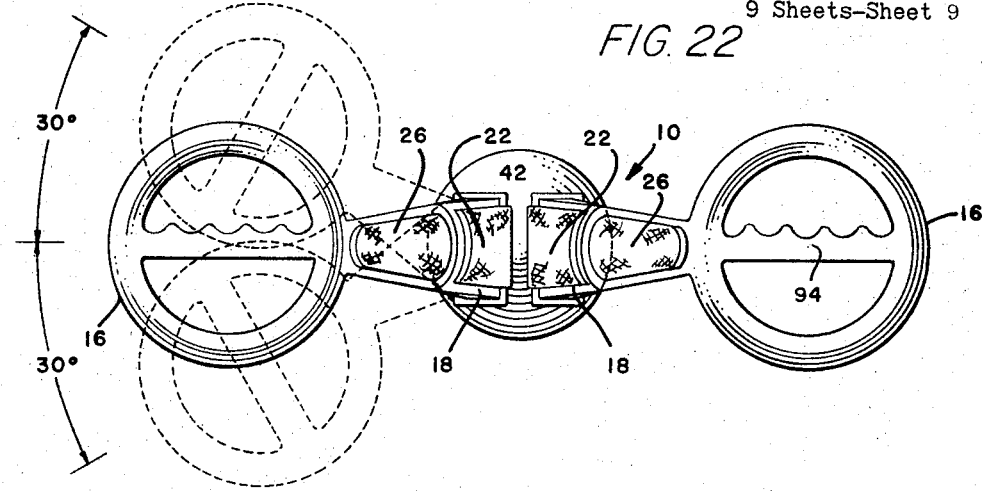
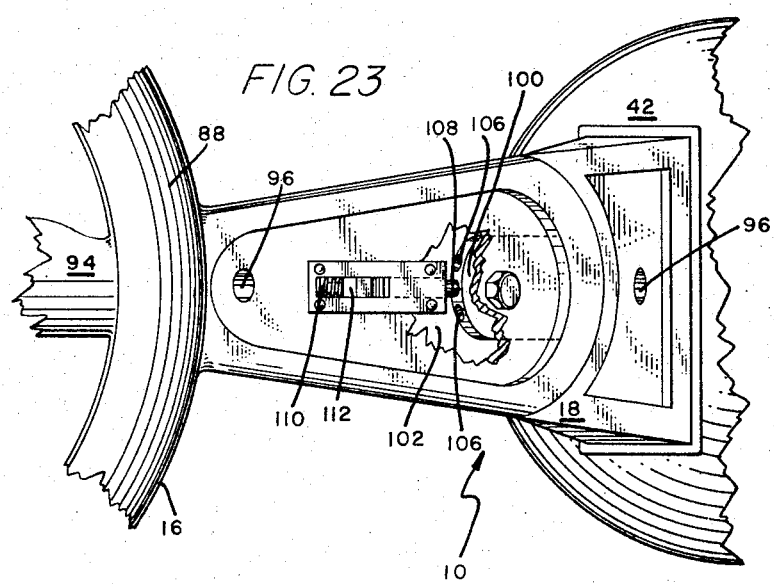
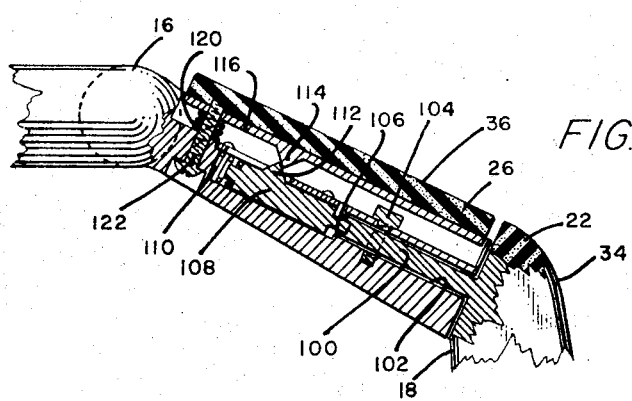
INVENTOR.
VINCENT J. WALTER
BY
ATTORNEY

United States Patent Office 3,368,422
Patented Feb. 13, 1968

3,368,422
VEHICLE STEERING GEAR
Vincent J. Walter, 1557 Woodland,
Wichita, Kans. 67203
Filed Oct. 22, 1965, Ser. No. 501,143
25 Claims. (Cl. 74—493)

ABSTRACT OF THE DISCLOSURE

Safety steering gear structure for automotive vehicles which takes the form of a pair of rearwardly extending arms having divergent rearmost portions. Such arms are pivotally mounted at their forward ends for divergent forward collapsing movement, with spring biased latch means being provided to normally secure the arms against pivotal collapsing movement, but which latch means will release the arms on forward crash forces against the arms. Preferred structures include a knock-out portion of the dashboard permitting greater forward movement of the arms; rotatable hand grips; selective angular adjustment means for the spinner rings in which the grips are rotatably mounted; and wedge means between the arms to facilitate their spreading apart under crash conditions.

Specification

My invention concerns vehicle steering gear. More particularly, my improvement in vehicle steering gear includes collapsible column features for safeguarding the vehicle driver's chest during crash conditions and includes spinner rings for hand gripping on a pair of arms (with further adjustability of disposition of the rings) for more convenient driving.

A substantial percentage of driver injuries and fatalities in crash conditions are due to injury of chest by the steering column. It is an object of my invention to avoid such injuries by an improved collapsible steering column construction.

In my invention I do not use a single large steering wheel (such as is used in most vehicles). This is partly for improving collapsing of the steering column but it is also for driving convenience. In turning, cornering and the like (as distinguished from normal substantially straight driving), the conventional steering wheel is a poor instrumentality. This was the reason for mounting spinner knobs on steering wheel which had some popularity in the past but such knobs are not satisfactory as they can involve only one hand at a time and only have one location on the steering wheel, they may strike the driver's hand during rapid wheel movement, and they can interfere with driving on occasion. However, the spinner principal is good if it can be provided in a construction avoiding these difficulties and other problems. A steering wheel requires a lot of manual turning in abrupt turns and a spinner can provide quicker and more accurate cornering. For example, rather square turns are often desirable but are not accomplished (resulting in cutting corners, swinging too wide, etc.) because of the lack of adaptability of the normal driving wheel. It is an object of my invention to provide improved spinner driving gear, and, further, to provide two handed spinners.

Various drivers prefer to hold a wheel at different points on its circumference or may wish to shift points on its circumference from time to time to avoid tiring or for different driving conditions. It is important, therefore, in making a substitute for a steering wheel to provide similar adaptability for the position of the driver's hands and that is another object of my invention.

Further objectives and advantages of my invention will appear from the following complete description of the invention, read with reference to the drawings. The drawings include:

FIGURE 1 is a frontal view of a specific embodiment of my invention showing a steering column assembly (in driving position) and associated vehicle dashboard.

FIGURE 2 is similar to FIGURE 1 but shows the steering column assembly in collapsed position.

FIGURE 3 is a side view, partly in section, corresponding to FIGURE 1, and FIGURE 4 is a similar view corresponding to FIGURE 2, both views particularly showing a dashboard panel adapted for displacement upon steering column assembly collapse.

FIGURE 5 is a view similar to FIGURE 1 but in perspective.

FIGURES 6, 7 and 8 are views in planes parallel to the steering column assembly axis, respectively showing the steering column assembly in side view (in driving and in collapsed positions) and in end view.

FIGURE 12 is viewed in the same plane as FIGURE 5 and is an enlarged view, partly in section, of the base of the steering column assembly.

FIGURES 13 and 14 are perspective views of portions of the FIGURE 12 assembly.

FIGURE 15 is an exploded view of the parts in the FIGURE 12 assembly.

FIGURE 16 is a top view of the base of the steering column assembly.

FIGURE 17 is a view of the same base as in FIGURE 16 but is shown in side view and in section.

FIGURE 22 is a view, in a plane at right angles to the steering column axis, of the structure shown in FIGURES 6, 7 and 8 and showing the adjustable positioning of a spinner ring.

FIGURE 23 is view in the same sense as FIGURE 22 and showing enlarged details of the means for adjusting spinner ring positions, certain parts being broken away to better show details.

FIGURE 24 is a side view, partly in section, of the same assembly as that shown in FIGURE 23.

Figure 10:
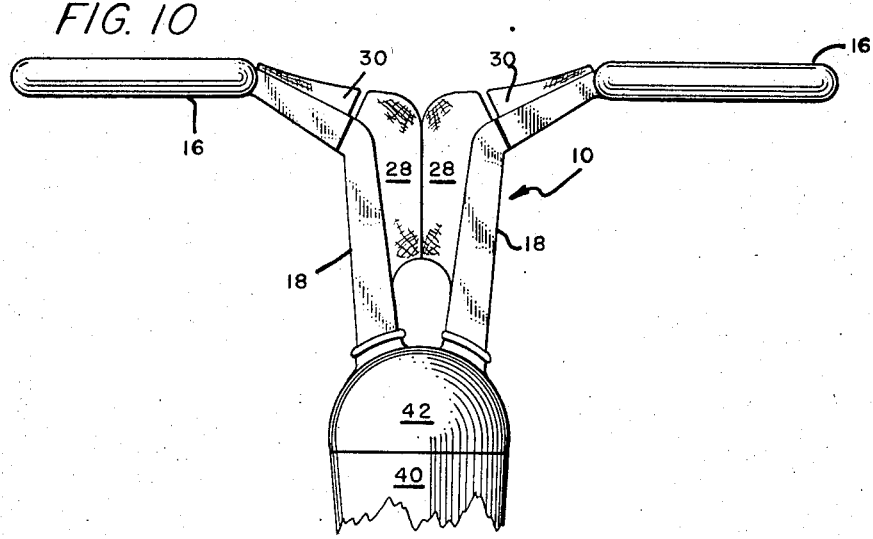
FIGURES 10 and 11 are similar to FIGURES 6 and 7 only showing a modification in the padding of the steering column assembly.

The steering gear column means 10 is adapted for collapse from rear normal driving position (FIGURES 1, 3, 5, 6, 8, 10, 18, 22) to forward collapsed position (FIGURES 2, 4, 7, 11) (the terms "forward" and "rear" are relative to forward and rear of a vehicle). This collapsible feature is adapted for crash conditions wherein otherwise the driver's chest might be injured by the steering gear column. For this reason, the collapsible provisions have primary application to vehicles, such as automobiles, where accidents of this type may occur. As will be understood by those skilled in the art, the structure could be adapted for the additional or alternative use of merely getting the steering gear column out of the way to provide additional room for the driver in getting in and out of the vehicle, but that is not the primary purpose in connection with the specific embodiment of the invention described and shown herein. For convenience in the specification and claims, orientation to a dashboard is given (such as the vehicle dashboard 12 shown in the drawings), but in the case of any vehicle not having the type of dashboard found in an automobile (such as a type of aircraft) the claims are to be interpreted as if the vehicle had an automotive type dashboard.

As shown in FIGURES 1–5, dashboard 12 has a panel 14 releasably secured in place so as to be readily displaced forward of the face of dashboard 12 upon force applied thereto by positions (spinner rings 16 and arms 18) of steering gear column means 10. Panel 14 may be formed of various materials and releasably secured in different ways but is indicated in the drawing to be a foamed body (such as a semi-rigid type of sponge rubber or foamed plastic) which has enough resiliency to be merely press fit in place in dashboard recess 20.

As a convenience in the specification and claims, the collapsing force on steering gear column means 10 is described as being the chest of the driver in a crash condition but depending on circumstances and also the force of the spring means normally holding column means 10 in rear driving position, the force of the driver's hands on spinner rings 16 in a collision may force column means 10 into collapsed position (incidentally, panel 14 is preferably of a material and is so readily displaced as to not injure the driver's hands during collapse). However, the structure is adapted for the circumstance that the driver's chest may initially or later impact column means 10. To protect the driver in case of impact with steering gear column means 10, padding is provided at appropriate places including pads 22 inset in grooves 24 on the rear surfaces of arms 18 (particularly shown in FIGURES 6, 7, 12, 13, 15, 22 and 24) and pads 26 on the face of the portions of arms 18 housing the mechanism for adjustment of the positions of spinner ring 16 (particularly shown in FIGURES 6, 7, 9, 18, 19, 21, 22 and 24).

Figure 11:
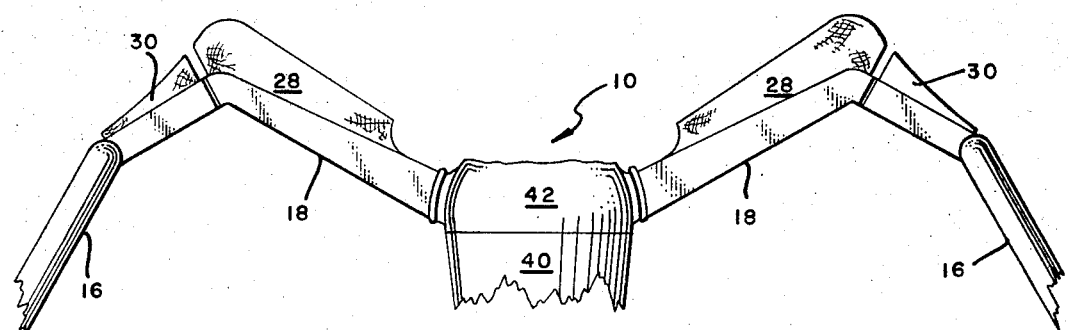

A modified padding is shown in FIGURES 10 and 11 in which pads 28 correspond to pads 22 and pads 30 correspond to pads 26. It will be observed that pads 28 substantially meet (or even can be lightly bonded together or can be made unitary of a material readily severable on a medical groove) and pads 30 are correspondingly contoured. The FIGURE 10 and 11 construction has the advantages of additional padding and of giving some illusion of joinder of the two arms 18 for aesthetic effect or to give the psychological reaction of solid unitary driving means.

The pads can be formed of natural or synthetic rubber which can be foamed to the extent desired to give a selected resiliency.

Arms 18 are oppositely pivoted for collapse in a plane parallel to the axis of column means 10 (which may be considered to have an axis corresponding to the conventional steering wheel counterpart and being a continuation of the axis of the steering gear central shaft). Arms 18 preferably diverge as they extend rearwardly (in driving position) and, as illustrated in FIGURES 6 and 24, preferably have forward portions 34 diverging rearwardly at a first angle and have rear portions 36 diverging rearwardly at a second angle greater than the first angle (portion 36 really being a pivotal tongue and groove joinder section between arm 18 and spinner ring 16 but being conveniently thought of as a portion of arm 18). The contour and disposition of arms 18 are desirable for aesthetic and functional purposes but are not absolutely necessary. However, note that the angular disposition of arms 18 means that in crash conditions impact of the same by the driver's chest results in quick and easy yielding of the arms in these high acceleration conditions, whereas rapid enough opening might not occur if the arms were at substantially zero angle to normal to the driver's chest.

The arms are pivoted from a forward central base member 40, the pivotal assembly being covered by a rubber or plastic elastic cap 42 (having flanged and beaded openings 43 for legs 18) which is disposed in an annular groove 44 in base 40 and retained by being stretched slightly in installation. Cap 42 being elastic, it readily distorts and stretches to accommodate movement of arms 18 into collapsed position (see FIGURES 7 and 11). Referring particularly to FIGURE 12, base 40 is secured by nut 46 (with interposed washer 48) to a threaded member 50.

This member 50 may be the central shaft which extends forwardly in the steering gear and rotates within post 52 (see FIGURES 3 and 4) or threaded member 50 may be a bolt secured to said shaft. Rotation of arms 18, base 40 and threaded member 50 results in vehicle steering. Nut 46 is set in a counterbase 54 which also provides room for certain latch parts hereafter to be described.

Base 40 has four lugs 56 with openings 58 accepting pivot pins 60 on which arms 18 pivot (extending through openings 62 in arms 18) on parallel axes.

Latch means are provided (see FIGURES 12, 13, 14 and 15) normally latching arms 18 in rear driving position and include a latching flange 64 on each arm 18, a central shear latch plate 66, and a compression spring 68 normally holding plate 66 against flanges 64. The spring assembly includes a bolt 70 (for adjusting tension) and a washer 72 on top of plate 66, and a retaining plate 74 (having screws 75 secured in threaded openings 77 in base 40) and a washer 76, a lock washer 78 and a nut 80, on either side of spring 68. When sufficient force is applied to arms 18 to move them to forward collapsed position, spring 68 is compressed sufficiently to permit arm flanges 64 to press past central shear plate 66 and escape, thereby freeing arms 18 to move from driving position to forward collapsed position. Note that arms 18 are then prevented from completely returning to driving position because of abutment of the opposite sides of flanges 64 with the opposite face of shear plate 66, thereby minimizing any tendency of arms 18 to rebound (the thicker flanges 64 and plate 66 are the more limiting the construction against rebounding).

FIGURES 9 and 22–24 particularly detail the construction of spinner rings 16. They include a lower metal annulus 86, a retaining plastic bezel 88 secured by screws 90, and an inner rotatable plastic ring 92 having a diametrical contoured hand hold 94, whereby, if hand hold 94 is grasped, spinning movement can be given to the associated arm 18. A spinner ring is provided for each hand of the driver and this is a convenient steering mechanism, and particularly in turning and cornering when one or both hand holds 94 are used. At other times a driver may prefer to grasp the outer ring part of the time. Arms 18 have been provided with longitudinal passageways 96 for electrical conduits (see FIGURES 13, 14, 15, 18, 19, 20 and 23) and this means electrical connection can be provided on spinner rings 16 for electrical controls.

Different drivers prefer to grasp a regular steering wheel at different points on its circumference and the same driver may prefer to change hand holds for different driving conditions or for relaxation. It is important, therefore, to provide for different dispositions of the spinner rings 16 relative to arms 18 (generally in a plane normal to the axis of column means 10) and FIGURE 22 (on the left) shows adjustment of spinner ring 16 through an angle of about 30 degrees on each side of a plane passing through both arms 18.

Figure 9:
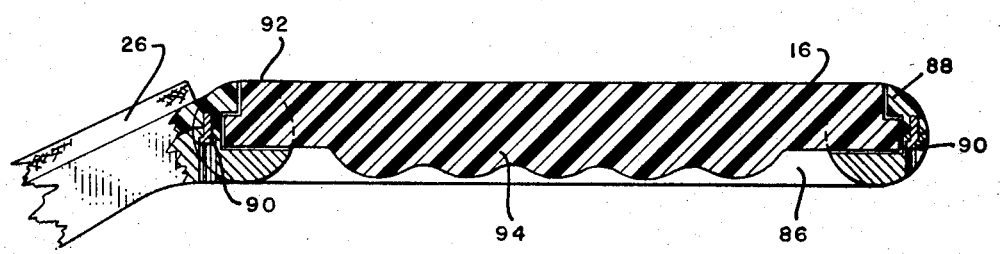
FIGURE 9 is a side view, on enlarged scale and partly in section, of a spinner ring.
Figure 18:
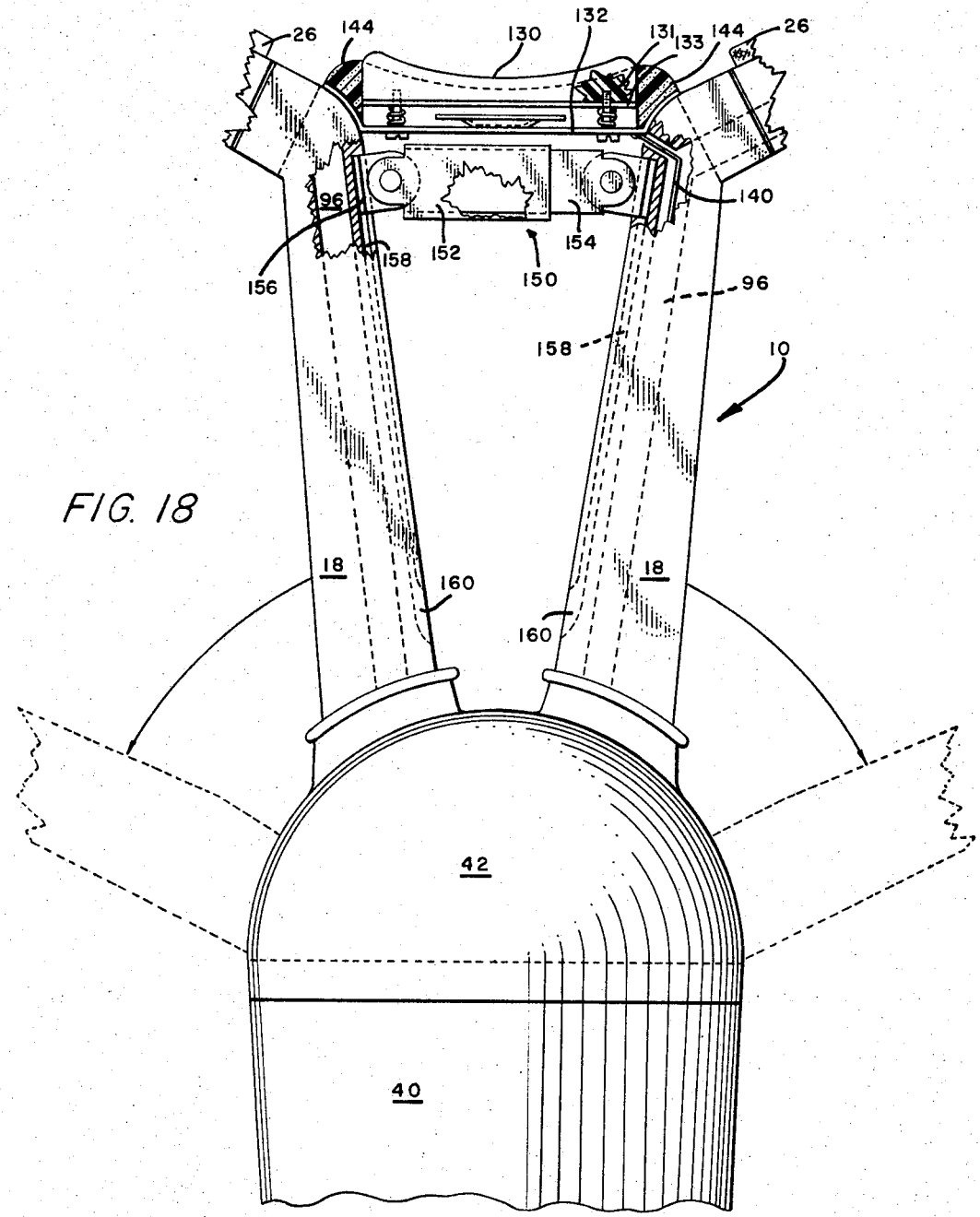
FIGURES 18 and 19 are views in the same sense as FIGURE 6 of positions of the steering column assembly and showing a horn mechanism and an expansion link, FIGURE 18 showing the parts in a normal driving condition and FIGURE 19 showing the parts in partly collapsed condition.

The construction permitting such adjustment is detailed in FIGURES 23 and 24 and includes a tongue 100 on arm 18 and a matching groove 102 formed in an extension from spinner ring 16 forming a part of the metal annulus 86 (see FIGURE 9). A pivot pin 104 forms the axis for pivoting. Spinner ring 16 is selectively locked in position (three positions illustrated 30 degrees apart) by means including three detent openings 106 in the end of tongue 100 and a sliding detent pin 108 selectively positioned in openings 106. Detent pin 108 is urged into engagement by spring 110.

Retraction of the detent is accomplished by a sloping camming surface 112 on the upper side of detent 108 and a matching sloping camming surface 114 on the under side of pressure plate 116. Movement of the camming surfaces (by normal pressure) into engagement results in retraction of detent 108 for changing position of the spinner ring 16. Plate 116 is normally held with the camming surfaces separated by a spring 120 around a screw 122 which limits separation of plate 116.

It will be understood that spinner rings 16 and their provisions for adjustment can have application to a different type of column, i.e., a non-collapsible column. Also, in general, instead of being circular in overall outline, this hand gripping means could have other configurations, such as an oblong configuration with a spinner ring therein. The hand gripping means could have provisions for various electrical controls, as passageways 96 in arms 18 are for the purpose of housing electrical conduits.

Referring to FIGURES 18, 19, 19a, 20 and 21, a horn button 130 (which may be a plastic body 131 on a metal base 133) is mounted on a malleable metal support 132 by screws 134 secured to base 133 and limiting separation by abutment of screws heads against the under surface of support 132, the horn button 130 normally being pressed away from support 132 by compression springs 136 around screws 134. When button 130 is depressed by the driver it presses and activates the horn switch 138. Electrical leads 140 to switch 138 extend through passageway 96 in arm 18 (and are secured by means yielding under force so that leads 140 do not interfere with displacement of the horn assembly in the manner shown in FIGURE 19). The malleable metal support 132 is bonded to adjacent surfaces of arms 18 and foam rubber wedges 144 fill the end spaces between support 132 and button 130 to provide a suitable appearance.

Figure 19:
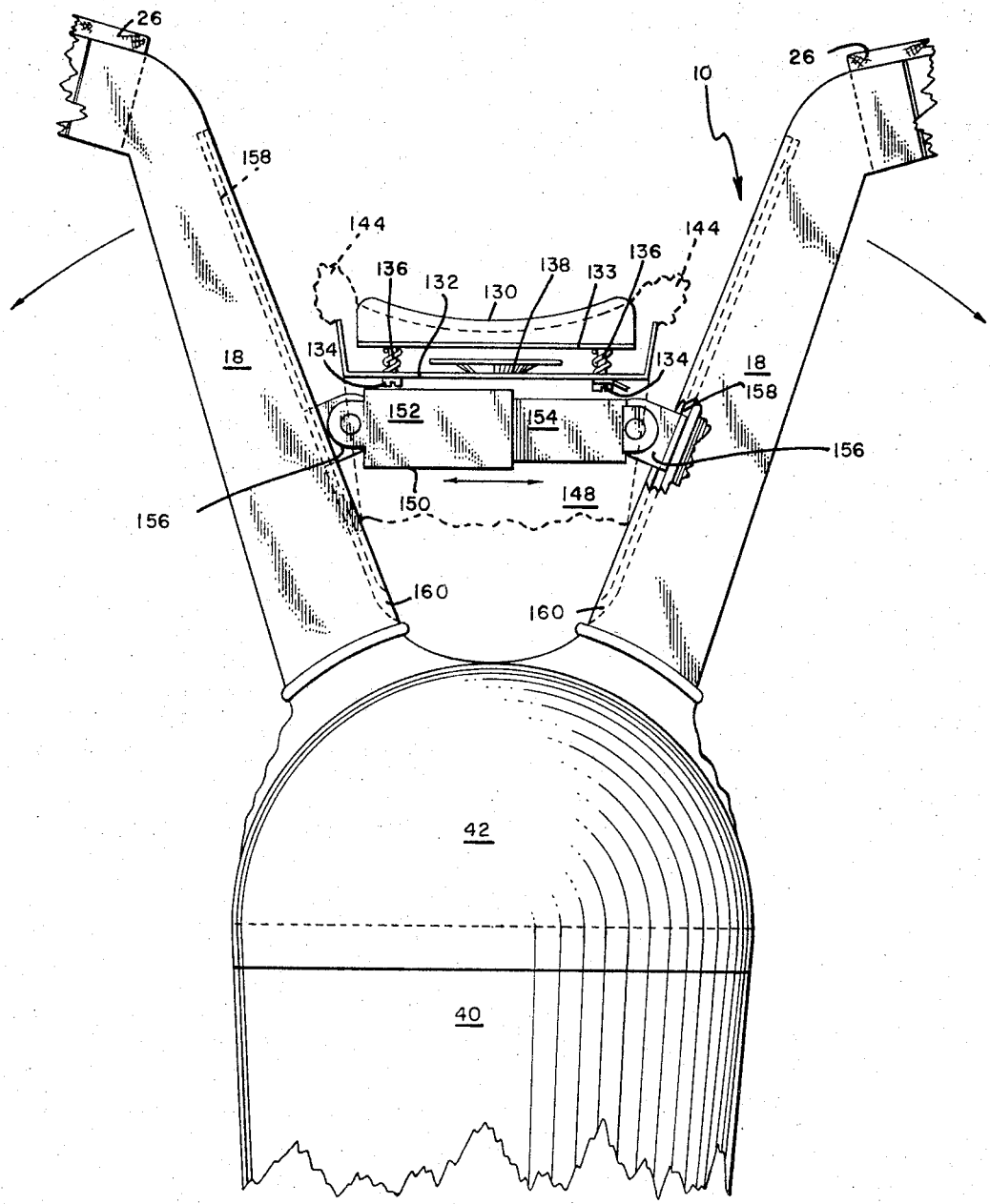
Figure 21:
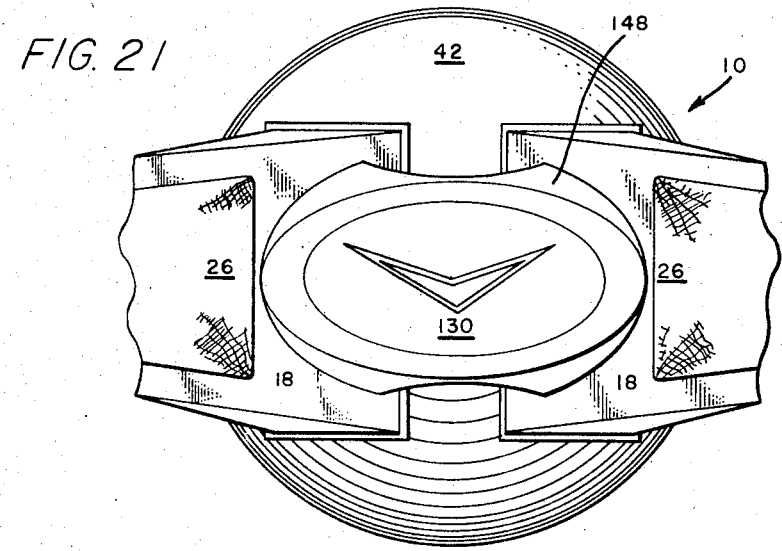
FIGURE 21 is a top view of the structure shown in FIGURE 18.
Figure 19A:
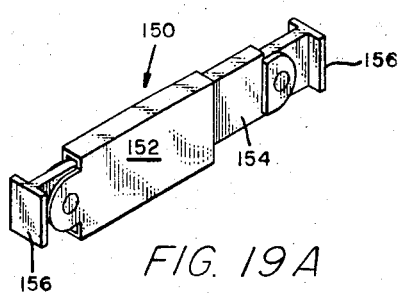
FIGURE 19a is a perspective view of the expansion link of FIGURES 18 and 19.
Figure 20:
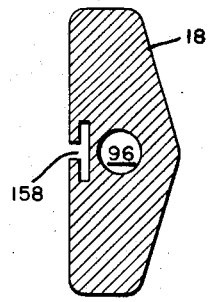
FIGURE 20 is a typical section of one of the column arms shown in FIGURES 18 and 19.

As illustrated in FIGURE 19, when arms 18 move toward forward collapsed position during crash conditions, the malleable metal support 132 is sheared from attachment to arms 18 and the end walls may be distorted thereby extruding wedges 144, whereby the horn button falls clear and does not interfere with collapse of the arms. (A decorative covering housing 148 may be provided which will tend to move the horn button assembly with a telescoping link 150 as shown, but covering 148 is incidental to the functioning of the parts.) Of course the chest of the driver may first impact the horn button assembly so it is important the horn assembly does not interfere with or will even enhance the spreading of arms 18. As an alternative to bonding support 132 to arms 18, instead support 132 may be secured to link 150, whereby it will follow link 150, during column collapse, much in the same manner as shown in FIGURE 19 but because of being directly secured thereto.

The purpose of the telescoping link 150 is to facilitate separation of arms 18, because, in the rapid acceleration occurring in crash conditions, arms 18 might not pivot fast enough as they are angled at the driver's body. Link 150 is not attached to the horn assembly and could be used separately, although a resilient pad should be substituted for the horn assembly to transmit force to link 150 if the horn assembly were not present. It will be understood that pressure on link 150 (downward as viewed in FIGURES 18 and 19) will tend to separate arms 18.

Link 150 has two telescoping parts 152, 154 and has pivotally mounted flanged members 156 at its ends. Arms 18 have T-shaped longitudinal slots 158 receiving the flanged pivotal members 156. The ends of slots 158 are open at 160 so that link 150 can escape from slots 158 as the arms further spread apart from the position of FIGURE 19, so as not to interfere with arm spreading or to be in the way if the driver strikes their former area.

The operation of the invention in collapse of arms and adjustability of spinner rings has already been discussed. The way in which the objectives of the invention of the preamble have been met and additional features, objectives and advantages of my invention will be understood from the preceding description. I do not wish to be understood as limiting myself to the precise details of the invention as described but instead wish to cover the modifications thereof which will occur to those skilled in the art after reading my invention and which are properly within the scope of my invention.

I claim:
1. The improvement in steering gear in a vehicle extending rearwardly relative to a dashboard, comprising:
 (a) steering gear column means extending rearwardly relative to said dashboard having collapsible means whereby said collapsible means is collapsible from a rear normal driving position to a forward collapsed position in which at least portions of said collapsible means are forward of the face of said dashboard
 (b) said dashboard having panel means in the area of said forward collapsed position of said collapsible means which is releasably secured in place so as to be readily displaced forward of the face of said dashboard upon force applied thereto by said portions of said collapsible means.

2. The improvement in steering gear in a vehicle extending rearwardly relative to a dashboard, comprising:
 (a) steering gear column means extending rearwardly relative to said dashboard having collapsible means pivotally connected thereto whereby said collapsible column means is collapsible from a rear normal driving position to a forward collapsed position under impact of the driver's chest against said collapsible means in crash conditions
 (b) spring biased latch means in said steering column means for locking said collapsible means from full return to said rear position when said collapsible means moves from said rear position to said forward position, whereby the driver is protected relative to rebound of said collapsible means.

3. The improvement in steering gear of an automotive vehicle of the type including a dashboard with the steering gear thereof extending rearwardly relative to a dashboard, comprising:
 (a) steering gear column means including collapsible means extending rearwardly relative to said dashboard whereby said collapsible means is forwardly collapsible from a rear normal driving position to a forward collapsed position
 (b) said collapsible means being formed by two independent pivotally mounted arms each having means for hand gripping at its rear end, said arms being mounted to pivot together about the axis of said steering gear column means in driving and each being mounted to pivot about an axis disposed substantially forwardly of the rear ends of the arms that is different from and at an angle to said axis of said column means during collapse.

4. The subject matter of claim 3 in which there are protective resilient pads on surfaces of said arms exposed in said collapsed position to impact by the chest of the driver in crash conditions.

5. The subject matter of claim 3 in which said arms diverge as they extend rearwardly in said rear position and in which said arms spread farther apart in moving to said collapsed position.

6. The subject matter of claim 5 in which there are protective resilient pads on surfaces of said arms exposed in said collapsed position to impact by the chest of the driver in crash conditions, said pads on opposite arms substantially meeting in said rear position of said collapsible means.

7. The subject matter of claim 5 in which there is telescoping link means between said arms in position to be contacted by the chest of the driver in crash conditions to assist in spreading said arms by force transmitted from the driver's chest to said arms.

8. The subject matter of claim 7 in which said arms have T-shaped longitudinal slots and said link means has flanged mating ends whereby upon arm collapse said link means can travel down said arms, the forward ends of said slots being open so said link means can escape at its forwardmost position.

9. The subject matter of claim 5 in which at least one of said arms has a longitudinal passageway and electrical conduit means in said passageway, a horn switch connected to said electrical conduit means, and a support for said switch extending between the rear ends of said arms and secured thereto.

10. The subject matter of claim 9 in which said support includes end malleable metal members secured to said arms and separable therefrom by shearing under force of a driver's chest in crash conditions.

11. The subject matter of claim 10 in which there are resilient wedges between said malleable metal members and the remainder of said support adapted for partial displacement as said malleable metal members are deformed during shear, and a covering housing extending forwardly from around said support to cover the parts.

12. The subject matter of claim 5 in which said arms have first forward portions diverging at a first angle and second rear portions diverging rearwardly at a greater angle than said first angle.

13. The subject matter of claim 3 in which the means for hand gripping on each arm is a spinner ring.

14. The subject matter of claim 3 in which there is spring biased latch means automatically locking said arms from full return to said rear position when said arms move from said rear position to said forward position when impacted by a driver's chest during crash conditions whereby the driver is protected relative to rebound of said arms.

15. The subject matter of claim 3 in which said column means has a forward central base member to which said arms are pivoted and adapted to be secured to the central shaft which extends forwardly in the steering gear, and spring biased latch means supported by said central member between said arms and normally latching said arms in said rear position but automatically unlatching by force applied to said arms by the driver's chest during crash conditions.

16. The subject matter of claim 15 in which said spring biased latch means includes a latching flange on each arm, a central shear latch plate normally retaining said latch means, and spring means acting on said latch plate whereby said flanges can escape said latch plate by displacement of said latch plate against the force of said spring means during pivoting of said arms as they start to move from said rear position to said forward position.

17. The subject matter of claim 15 in which there is an elastic cap over said central members and having openings to pass said arms and adapting to movement of said arms from said rear position to said forward position by distortion and stretching.

18. The subject matter of claim 3 in which said means for hand gripping has pivotal mounting means together with means for securing the last recited means against pivotal movement from selected angular relationships thereby providing adjustable means for pivoting each means for hand gripping into a plurality of positions relative to the longitudinal axis of the associated arm.

19. The improvement in steering gear in a vehicle extending rearwardly relative to a dashboard, comprising:
(a) steering gear column means extending rearwardly relative to said dashboard formed by a plurality of independent and divergent arms mounted to pivot together about the axis of the steering gear column means
(b) each arm having means for hand gripping at its free end
(c) pivotal mounting means for and spaced from said means for hand gripping together with means for selectively securing the mounting means against pivotal movement at a plurality of angular relationships thereby providing adjustable means for pivoting said means for hand gripping in a generally upright plane into a plurality of positions relative to the longitudinal axis of the associated arm, so that the position of the hand gripping means can be adjusted to the preference of the driver.

20. The subject matter of claim 19 wherein the selective securing means includes detent means to selectively fix the position of each hand gripping means relative to the longitudinal axis of the associated arm.

21. The subject matter of claim 20 in which said pivotal mounting means includes tongue and groove means between each arm and its associated hand gripping means with the tongue and groove being pivotal relative to each other and said detent means including said tongue and said groove means having a series of detent openings in one and a mating sliding, spring pressed detent pin on the other, the detent pin having a sloping camming surface on its upper side and an overlying plate having an opposite sloping camming mating surface on its under side and spring means normally pressing said plate to separate said camming surfaces whereby pressure on said plate moves said camming surfaces into engagement withdrawing said detent pin relative to said detent openings for pivotal adjustment of said means for hand gripping.

22. The subject matter of claim 21 in which said plate is covered with a resilient pad to protect the chest of the driver striking said plate during crash conditions.

23. The subject matter of claim 19 in which said means for hand grippings on each arm is a spinner ring having a bezel detachably secured thereto, said spinner ring and the bezel defining therebetween a grooved annulus, and a spinner forming a ring set in the annulus groove and having a diametrical contoured hand hold, said bezel serving to secure said ring in said groove.

24. The subject matter of claim 19 in which said arms have longitudinal passageways for electrical conduit means extending as far as said means for hand gripping whereby the steering gear is adapted for use of various electrical hand controls.

25. The subject matter of claim 19 in which each means for hand gripping is pivotally adjustable through an angle of about 60 degrees.

References Cited

UNITED STATES PATENTS

| | | | |
|---|---|---|---|
| 2,111,028 | 3/1938 | Miller | 74—551.2 |
| 2,737,060 | 3/1956 | Russell | 74—552 |
| 2,836,079 | 5/1958 | Salch | 74—493 |
| 3,055,231 | 9/1962 | Daniel | 74—552 |

MILTON KAUFMAN, *Primary Examiner.*